(12) United States Patent
Narayanan et al.

(10) Patent No.: US 12,341,345 B2
(45) Date of Patent: Jun. 24, 2025

(54) CONVERTER STATIONS

(71) Applicant: GE Vernova Infrastructure Technology LLC, Greenville, SC (US)

(72) Inventors: Mita Babu Narayanan, Stafford (GB); Jorge Miguel Goncalves, Cambridgeshire (GB)

(73) Assignee: GE Vernova Infrastructure Technology LLC, Greenville, SC (US)

( * ) Notice: Subject to any disclaimer, the term of this patent is extended or adjusted under 35 U.S.C. 154(b) by 97 days.

(21) Appl. No.: 18/004,595

(22) PCT Filed: Jul. 20, 2021

(86) PCT No.: PCT/EP2021/070226
§ 371 (c)(1),
(2) Date: Jan. 6, 2023

(87) PCT Pub. No.: WO2022/018066
PCT Pub. Date: Jan. 27, 2022

(65) Prior Publication Data
US 2023/0253796 A1    Aug. 10, 2023

(30) Foreign Application Priority Data

Jul. 23, 2020  (EP) .................................... 20275126

(51) Int. Cl.
*H02J 3/36* (2006.01)
*H02M 7/483* (2007.01)

(52) U.S. Cl.
CPC ............. *H02J 3/36* (2013.01); *H02M 7/4835* (2021.05); *H02M 7/4833* (2021.05)

(58) Field of Classification Search
CPC .... H02J 3/36; H02J 2003/365; H02M 1/0074; H02M 7/4833; H02M 7/4835; Y02E 60/60
See application file for complete search history.

(56) References Cited

U.S. PATENT DOCUMENTS

| 9,356,536 B2 | 5/2016 | Bala et al. |
| 2013/0182467 A1* | 7/2013 | Cross .................. H02M 7/4835 |
| | | 363/35 |

FOREIGN PATENT DOCUMENTS

| CN | 106160545 A * 11/2016 ............ H02M 7/487 |
| EP | 3582379 A1 12/2019 |

(Continued)

OTHER PUBLICATIONS

Machine translation of CN-106160545-A, Nov. 23, 2016. Obtained from internal USPTO database on Sep. 18, 2024. (Year: 2016).*

(Continued)

*Primary Examiner* — Fred E Finch, III
(74) *Attorney, Agent, or Firm* — Eversheds Sutherland (US) LLP

(57) ABSTRACT

A converter station, for a bipole power transmission scheme, includes a first voltage source converter and a second source converter. Each converters have a first terminal as transmission conduit and a second terminal as a return conduit. The second terminal of the return conduit of the first converter is electrically connected to the first terminal of the transmission conduit of the second converter as being a same terminal. Both voltage source converters also includes at least one converter limb which extends between the first and second terminals of each converters. The or each converter limb includes first and second limb portions that are separated by a corresponding first and second AC terminal which is for connection to a respective phase of a first or second AC network.

8 Claims, 2 Drawing Sheets

(56) References Cited

FOREIGN PATENT DOCUMENTS

| WO | WO-2014111595 A1 | * | 7/2014 | ............... | H02M 1/32 |
| WO | WO-2015110185 A1 | * | 7/2015 | ............... | H02M 1/32 |
| WO | WO-2018145724 A1 | * | 8/2018 | ........... | H02M 7/7575 |
| WO | 2019161907 A1 | | 8/2019 | | |

OTHER PUBLICATIONS

L. Hou et al., "A Combined Modular Multilevel Converters Topology with DC Fault Ride-Through Capability for Bulk Power Bipolar-HVDC Transmission Systems," IEEE/IAS I&CPS Asia, Weihai, China, Jul. 13-15, 2020, pp. 681-686, doi: 10.1109/ICPSAsia48933.2020.9208387. (Year: 2020).*

International Search Report and Written Opinion for PCT/EP2021/070226, dated Oct. 26, 2021, 16 pages.

* cited by examiner

CONVERTER STATIONS

TECHNICAL FIELD

This invention relates to converter station for a bipole power transmission scheme, and to a method of operating such a converter station.

BACKGROUND OF THE INVENTION

In high voltage direct current (HVDC) power transmission networks AC power is typically converted to DC power for transmission via overhead lines, under-sea cables and/or underground cables. This conversion removes the need to compensate for the AC capacitive load effects imposed by the power transmission medium, i.e. the transmission line or cable, and reduces the cost per kilometre of the lines and/or cables, and thus becomes cost-effective when power needs to be transmitted over a long distance. DC power can also be transmitted directly from offshore wind parks to onshore AC power transmission networks.

The conversion between DC power and AC power is utilised where it is necessary to interconnect DC and AC networks. In any such power transmission network, converters (i.e. power converters) are required at each interface between AC and DC power to effect the required conversion from AC to DC or from DC to AC. One type of power converter is a voltage source converter.

Meanwhile, the choice of the most suitable HVDC power transmission scheme within a HVDC power transmission network differs, depending on the application and scheme features. One type of such scheme is a bipole power transmission scheme.

SUMMARY OF THE INVENTION

According to a first aspect of the invention there is provided a converter station, for a bipole power transmission scheme, comprising:
  a first voltage source converter having a first terminal for connection to a first transmission conduit, a second terminal for connection to a return conduit, and at least one converter limb extending between the first and second terminals, the or each converter limb including first and second limb portions separated by a corresponding first AC terminal for connection to a respective phase of a first AC network, the or each first limb portion including a first chain-link converter extending between the associated first AC terminal and the first terminal, the or each second limb portion including a second chain-link converter extending between the associated first AC terminal and the second terminal, and each chain-link converter including a plurality of series connected chain-link modules each having a plurality of switching elements connected in parallel with an energy storage device whereby each chain-link converter is controllable to provide a stepped variable voltage source; and
  a second voltage source converter having a third terminal for connection to a second transmission conduit, a fourth terminal for connection to the return conduit, and at least one converter limb extending between the third and fourth terminals, the or each converter limb including third and fourth limb portions separated by a corresponding second AC terminal for connection to a respective phase of a second AC network, the or each third limb portion including a third chain-link converter extending between the associated second AC terminal and the third terminal, the or each fourth limb portion including a fourth chain-link converter extending between the associated second AC terminal and the fourth terminal, and each chain-link converter including a plurality of series connected chain-link modules each having a plurality of switching elements connected in parallel with an energy storage device whereby each chain-link converter is controllable to provide a stepped variable voltage source,
  each of the second and third chain-link converters including a first number of series-connected chain-link modules, and each of the first and fourth chain-link converters including a second number of series-connected chain-link modules, the second number being greater than the first number.

Providing each of the first and fourth chain-link converters with a second, greater number of series-connected chain-link modules allows the combined first and second voltage source converters to withstand a worst case transient fault condition in terms of voltage stress on individual energy storage devices, i.e. an internal AC phase to return conduit, e.g. ground, fault.

Meanwhile, limiting the number of series-connected chain-link modules included in each of the second and third chain-link converters to a lower, first number provides a given degree of converter performance but reduces the total number of chain-link modules in each voltage source converter, and so leads to a significant reduction in the capital cost of the converter station.

Additionally, having a reduced total number of chain-link modules provides the option of reducing the size of the overall structure and footprint of each chain-link converter, as well as lowering the switching losses associated with each chain-link converter which allows the use of a smaller cooling plant to service the chain-link converters, and thereby provides still further options for reducing the overall footprint, and hence cost, of the associated converter station.

Having a reduced total number of chain-link modules also lessens the maintenance burden and allows operators to carry fewer spare chain-link modules for use in case of failure.

Preferably each of the second and third chain-link converters include the same first number of series-connected chain-link modules.

Each of the first and fourth chain-link converters may include the same second number of series-connected chain-link modules.

The foregoing features help to simplify the overall control of each voltage source converter and, in turn, control of the converter station as a whole.

Optionally each chain-link module has the same topology.

Including chain-link modules that have the same topology, further assists with simplifying the control of each voltage source converter, as well as providing economies of scale in terms of production of the individual chain-link modules.

In a preferred embodiment of the invention each chain-link module includes a first pair of switching elements connected in parallel with the energy storage device in a half-bridge arrangement to define a 2-quadrant unipolar module.

Utilising 2-quadrant unipolar modules throughout each voltage source converter helps to maximise the cost saving achieved by reducing the total number of chain-link modules needed to provide a given degree of converter performance.

Preferably at least one voltage source converter includes a corresponding voltage source converter controller programmed to control the stepped variable voltage source provided by the said corresponding voltage source converter, and when doing so to balance the total energy stored by the energy storage devices in one limb portion of the said voltage source converter with the total energy stored by the energy storage devices in the other corresponding limb portion of the voltage source converter.

Balancing the total energy stored in opposed limb portions helps to ensure that only a minimal circulating current flows between the limb portions.

The at least one voltage source converter controller may be programmed to cause the chain-link modules in the limb portion having the higher second number of chain-link modules to store a proportionally lower individual average amount of energy than the individual average amount of energy stored by each of the chain-link modules in the other corresponding limb portion.

Such a feature readily achieves the desired energy balance between corresponding, opposed limb portions.

According to a second aspect of the invention there is provided a method of operating a converter station comprising:

a first voltage source converter having a first terminal for connection to a first transmission conduit, a second terminal for connection to a return conduit, and at least one converter limb extending between the first and second terminals, the or each converter limb including first and second limb portions separated by a corresponding first AC terminal for connection to a respective phase of a first AC network, the or each first limb portion including a first chain-link converter extending between the associated first AC terminal and the first terminal, the or each second limb portion including a second chain-link converter extending between the associated first AC terminal and the second terminal, and each chain-link converter including a plurality of series connected chain-link modules each having a plurality of switching elements connected in parallel with an energy storage device whereby each chain-link converter is controllable to provide a stepped variable voltage source; and a second voltage source converter having a third terminal for connection to a second transmission conduit, a fourth terminal for connection to the return conduit, and at least one converter limb extending between the third and fourth terminals, the or each converter limb including third and fourth limb portions separated by a corresponding second AC terminal for connection to a respective phase of a second AC network, the or each third limb portion including a third chain-link converter extending between the associated second AC terminal and the third terminal, the or each fourth limb portion including a fourth chain-link converter extending between the associated second AC terminal and the fourth terminal, and each chain-link converter including a plurality of series connected chain-link modules each having a plurality of switching elements connected in parallel with an energy storage device whereby each chain-link converter is controllable to provide a stepped variable voltage source, the method comprising the steps of:

providing each of the second and third chain-link converters with a first number of series-connected chain-link modules; and providing each of the first and fourth chain-link converters with a second number of series-connected chain-link modules, the second number being greater than the first number.

The method shares the benefits of the corresponding features of the converter station of the invention.

It will be appreciated that the use of the terms "first" and "second", and the like, in this patent specification is merely intended to help distinguish between similar features (e.g. the first and second transmission conduits, and the first and second voltage source converters), and is not intended to indicate the relative importance of one feature over another feature, unless otherwise specified.

Within the scope of this application it is expressly intended that the various aspects, embodiments, examples and alternatives set out in the preceding paragraphs, and the claims and/or the following description and drawings, and in particular the individual features thereof, may be taken independently or in any combination. That is, all embodiments and all features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

There now follows a brief description of preferred embodiments of the invention, by way of non-limiting example, with reference being made to the following figures in which.

DETAILED DESCRIPTION

Figure 1:
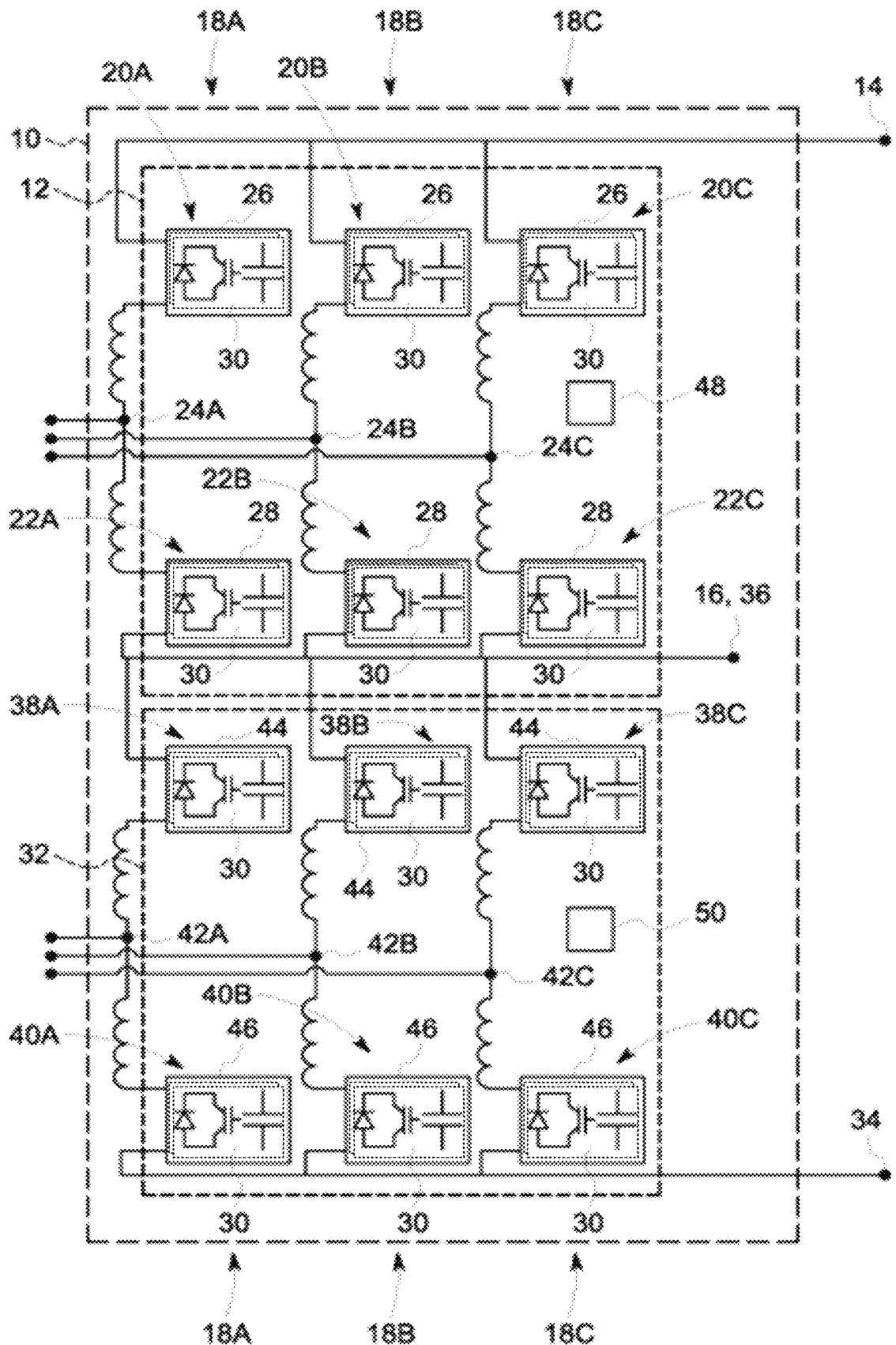
FIG. 1 shows a schematic view of a converter station according to a first embodiment of the invention.

A converter station according to a first embodiment of the invention is designated generally by reference numeral 10, as shown in FIG. 1.

The converter station 10 is for use in a bipole power transmission scheme (not shown), which typically would include a further converter station that, depending on the nature of the scheme, could be positioned in close proximity or remote from converter station 10 of the invention, and which is interconnected with the converter station 10 of the invention by first and second transmission conduits, i.e. first and second 'poles' (hence the scheme constituting a 'bipole' scheme) which permit the transmission of power between the converter stations.

Each of the first and second transmission conduits can be or include a subsea cable, although one or other might be, or include, an underground cable, an overhead line, or a mixture of such cables and line.

In use, the converter stations are also interconnected by a return conduit which normally is, or includes, a dedicated metallic return, which typically takes the form of a further subsea cable, although an electrical conductor of some other form may instead be used, as well as (albeit less desirably) an earth path.

In the embodiment shown, the converter station 10 includes a first voltage source converter 12 which has a first terminal 14 that, in use, is connected to the aforementioned first transmission conduit.

The first voltage source converter 12 also includes a second terminal 16 that, in use, is connected to the aforementioned return conduit which, as indicated may take the form of an earth path.

Three converter limbs 18A, 18B, 18C extend between the first and second terminals 14, 16, although other embodiments of the invention may include fewer than or more than three converter limbs.

Each converter limb 18A, 18B, 18C includes first and second limb portions 20A, 20B, 20C, 22A, 22B, 22C that are separated by a corresponding first AC terminal 24A, 24B, 24C which, in use, is each connected to a respective phase A, B, C of a first three-phase AC network.

Each first limb portion 20A, 20B, 20C includes a first chain-link converter 26 that extends between the associated first AC terminal 24A, 24B, 24C and the first terminal 14, while each second limb portion 22A, 22B, 22C includes a second chain-link converter 28 that extends between the associated first AC terminal 24A, 24B, 24C and the second terminal 16.

In turn, each of the first and second chain-link converters 26, 28 includes a plurality of series connected chain-link modules 30 (only one of which is shown schematically for clarity). Each of the chain-link modules 30 has a plurality of switching elements that are connected in parallel with an energy storage device, whereby each corresponding chain-link converter 26, 28 is controllable to provide a stepped variable voltage source.

More particularly, each chain-link module 30 has the same topology, and more particularly still each chain-link module 30 includes a first pair of switching elements that are connected in parallel with the energy storage device in a known half-bridge arrangement to define a 2-quadrant unipolar module. Switching of the switching elements selectively directs current through the energy storage device or causes current to bypass the energy storage device, such that each chain-link module 30 can provide zero or positive voltage and can conduct current in two directions.

The energy storage device takes the form of a capacitor, although other types of energy storage device, i.e. any device that is capable of storing and releasing energy to selectively provide a voltage, e.g. a fuel cell or battery, may also be used. More than one energy storage device may be used in each chain-link module.

In addition, each switching element includes a semiconductor device, typically in the form of an Insulated Gate Bipolar Transistor (IGBT).

It is, however, possible to use other types of self-commutated semiconductor devices, such as a gate turn-off thyristor (GTO), a field effect transistor (FET), a metal-oxide-semiconductor field-effect transistor (MOSFET), an injection-enhanced gate transistor (IEGT), an integrated gate commutated thyristor (IGCT), a bimode insulated gate transistor (BIGT) or any other self-commutated switching device. In addition, one or more of the semiconductor devices may instead include a wide-bandgap material such as, but not limited to, silicon carbide, boron nitride, gallium nitride and aluminium nitride.

The number of semiconductor devices in each switching element may vary depending on the required voltage and current ratings of that switching element.

Each of the switching elements also includes a passive current check element that is connected in anti-parallel with a corresponding semiconductor device. The or each passive current check element may include at least one passive current check device.

The or each passive current check device may be any device that is capable of limiting current flow in only one direction, e.g. a diode. The number of passive current check devices in each passive current check element may vary depending on the required voltage and current ratings of that passive current check element.

Other embodiments of the invention may include a different exemplary chain-link module which includes first and second pairs of switching elements and a capacitor that are connected in a known full bridge arrangement to define a 4-quadrant bipolar module. In a similar manner to the chain-link module 30 mentioned above, switching of the switching elements again selectively directs current through the capacitor or causes current to bypass the capacitor such that the other exemplary chain-link module can provide zero, positive or negative voltage and can conduct current in two directions.

In still further embodiments of the invention, each of the first and second chain-link converters 26, 28 may include solely the other exemplary chain-link modules, or a combination of chain-link modules 20 and the other exemplary chain-link modules.

Returning to the embodiment shown, the converter station 10 also includes a second voltage source converter 32 which has a third terminal 34 that, in use, is connected to the aforementioned second transmission conduit, as well as a fourth terminal 36 which, in use, is connected to the aforementioned return conduit.

Similarly, the second voltage source converter 32 also includes three converter limbs 18A, 18B, 18C that extend between the third and fourth terminals 34, 36. Again similarly, each converter limb 18A, 18B, 18C includes third and fourth limb portions 38A, 38B, 38C, 40A, 40B, 40C that are separated by a corresponding second AC terminal 42A, 42B, 42C which, in use, is connected to a respective phase A, B, C of a second three-phase AC network.

Each third limb portion 38A, 38B, 38C includes a third chain-link converter 44 which extends between the associated second AC terminal 42A, 42B, 42C and the third terminal 34, while each fourth limb portion 40A, 40B, 40C includes a fourth chain-link converter 46 which extends between the associated second AC terminal 42A, 42B, 42C and the fourth terminal 36.

Each of the third and fourth chain-link converters 44, 46 similarly includes a plurality of series connected chain-link modules 30, which have the same topology and constructions as the chain-link modules 30 in each of the first and second chain-link converters 26, 28, i.e. a first pair of switching elements, in the form of IGBTs with an anti-parallel diode, that are connected in parallel with a capacitor in a known half-bridge arrangement to define a 2-quadrant unipolar module.

Each of the second and third chain-link converters 28, 44 include the same first number of series-connected chain-link modules 30, and each of the first and fourth chain-link converters 26, 46 include the same second number of series-connected chain-link modules 30, with the second number being greater than the first number.

More particularly, the second number is typically about 5 to 10% larger than the first number.

In other embodiments of the invention (not shown), each of the second and third chain-link converters may have a different first number of chain-link modules to one another, and each of the first and fourth chain-link converters may have a different second number of chain-link modules to one another, but the different second numbers nevertheless remain larger than the different first numbers.

The first voltage source converter 12 includes a corresponding first voltage source converter controller 48, and the second voltage source converter 32 includes a corresponding second voltage source converter controller 50.

In use, the first controller 48 is programmed to control the stepped variable voltage source provided by the first voltage source converter 12, and when doing so to balance the total energy stored by the energy storage devices 30 in one limb portion 20A, 20B, 20C of the said first voltage source converter 12 with the total energy stored by the energy storage devices 30 in the other corresponding limb portion 22A, 22B, 22C of the first voltage source converter 12.

Figure 2:
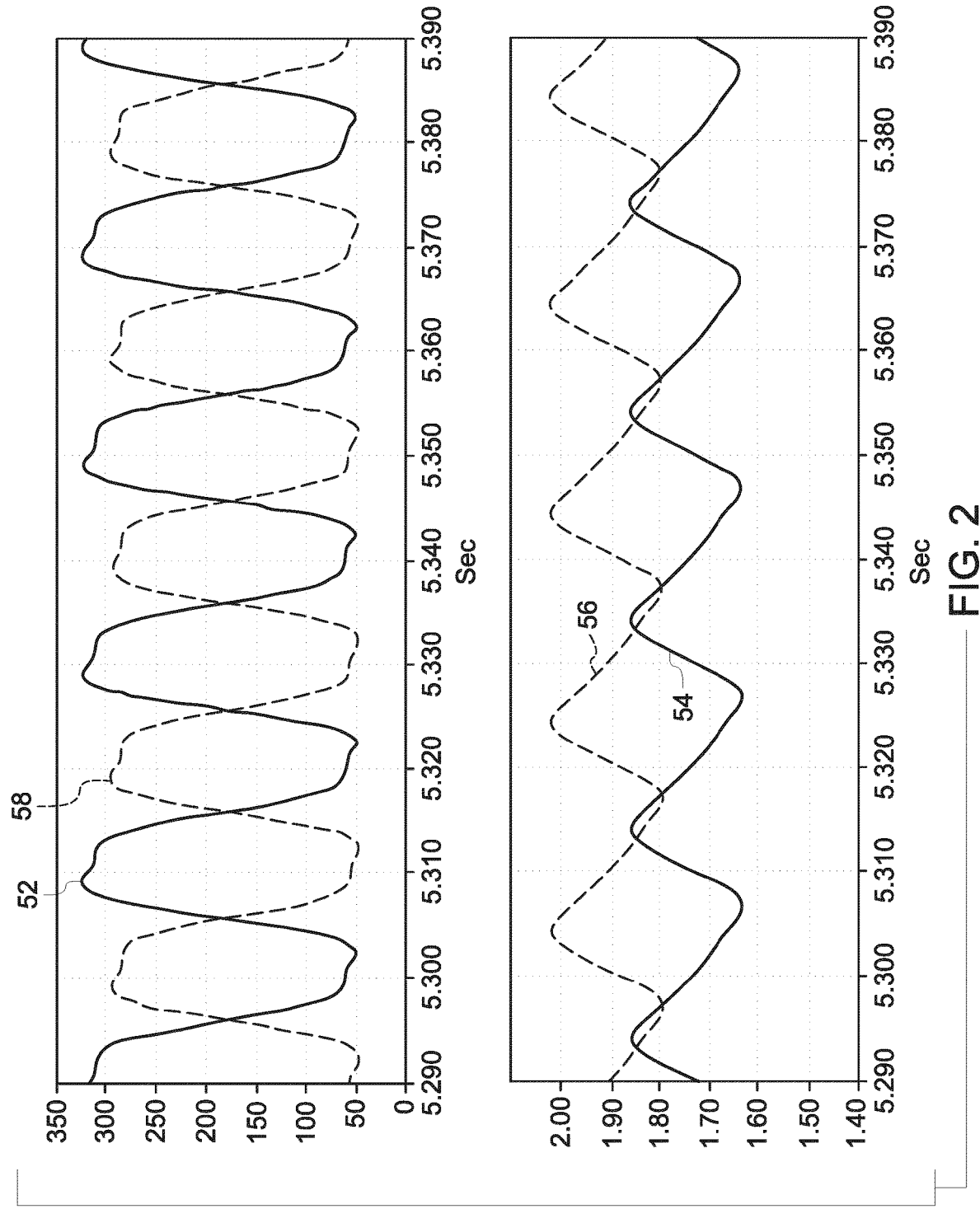
FIG. 2 illustrates a balancing of the total energy stored by energy storage devices in respective limb portions of a voltage source converter forming a part of the converter station shown in FIG. 1.

More particularly, the first controller 48 is programmed to cause the chain-link modules 30 in the first limb portion 20A, 20B, 20C having the higher, second number of chain-link modules 30, i.e. a second number 52 of modules, to store a proportionally lower individual average amount of energy 54 than the individual average amount of energy 56 stored by each of the chain-link modules 30 in the other corresponding second limb portion 22A, 22B, 22C having the lower, first number of chain-link modules 30, i.e. a first number 58 of modules, as shown schematically in FIG. 2. Other ways of balancing the energy stored in opposed limb portions are, however, also possible.

Similarly the second controller 50 is programmed, in use, to control the stepped variable voltage source provided by the second voltage source converter 32, and when doing so to balance the total energy stored by the energy storage devices 30 in one limb portion 38A, 38B, 38C of the said second voltage source converter 38 with the total energy stored by the energy storage devices 30 in the other corresponding limb portion 40A, 40B, 40C of the second voltage source converter 32. The second controller 50 may similarly achieve this by having the chain-link modules 30 in the third limb portions 38A, 38B, 38C store a proportionally higher individual average amount of energy than the individual average amount of energy stored by each of the higher number of chain-link modules 30 in the other corresponding fourth limb portion 40A, 40B, 40C.

We claim:

1. A converter station, for a bipole power transmission scheme, comprising:
    a first voltage source converter having a first terminal for connection to a first transmission conduit, a second terminal for connection to a return conduit, and at least one converter limb extending between the first and second terminals, the or each converter limb including first and second limb portions separated by a corresponding first AC terminal for connection to a respective phase of a first AC network, the or each first limb portion including a first chain-link converter extending between the associated first AC terminal and the first terminal, the or each second limb portion including a second chain-link converter extending between the associated first AC terminal and the second terminal, and each chain-link converter including a plurality of series connected chain-link modules each having a plurality of switching elements connected in parallel with an energy storage device whereby each chain-link converter is controllable to provide a stepped variable voltage source; and
    a second voltage source converter having a third terminal for connection to a second transmission conduit, a fourth terminal for connection to the return conduit, and at least one converter limb extending between the third and fourth terminals, the or each converter limb including third and fourth limb portions separated by a corresponding second AC terminal for connection to a respective phase of a second AC network, the or each third limb portion including a third chain-link converter extending between the associated second AC terminal and the third terminal, the or each fourth limb portion including a fourth chain-link converter extending between the associated second AC terminal and the fourth terminal, and each chain-link converter including a plurality of series connected chain-link modules each having a plurality of switching elements connected in parallel with an energy storage device whereby each chain-link converter is controllable to provide a stepped variable voltage source,
    wherein the second terminal and the fourth terminal are electrically connected to one another,
    wherein each of the second and third chain-link converters consists of a first number of series-connected chain-link modules, and each of the first and fourth chain-link converters consists of a second number of series-connected chain-link modules, the second number being greater than the first number.

2. A converter station according to claim 1, wherein each of the second and third chain-link converters consists of the same first number of series-connected chain-link modules.

3. A converter station according to claim 1, wherein each of the first and fourth chain-link converters consists of the same second number of series-connected chain-link modules.

4. A converter station according to claim 1, wherein each chain-link module has the same topology.

5. A converter station according to claim 4, wherein each chain-link module includes a first pair of switching elements connected in parallel with the energy storage device in a half-bridge arrangement to define a 2-quadrant unipolar module.

6. A converter station according to claim 1, wherein at least one of the first and second voltage source converters includes a corresponding voltage source converter controller programmed to control the stepped variable voltage source provided by the said corresponding voltage source converter, and when doing so to balance the total energy stored by the energy storage devices in one limb portion of the said voltage source converter with the total energy stored by the energy storage devices in the other corresponding limb portion of the voltage source converter.

7. A converter station according to claim 6, wherein the at least one voltage source converter controller is programmed to cause the chain-link modules in the limb portion having the higher second number of chain-link modules to store a proportionally lower individual average amount of energy than the individual average amount of energy stored by each of the chain-link modules in the other corresponding limb portion.

8. A method of operating a converter station comprising:
    a first voltage source converter having a first terminal connected to a first transmission conduit, a second terminal connected to a return conduit, and at least one converter limb extending between the first and second terminals, the or each converter limb including first and second limb portions separated by a corresponding first AC terminal connected to a respective phase of a first AC network, the or each first limb portion including a first chain-link converter extending between the associated first AC terminal and the first terminal, the or each second limb portion including a second chain-link converter extending between the associated first AC terminal and the second terminal, and each chain-link converter including a plurality of series connected chain-link modules each having a plurality of switching elements connected in parallel with an energy storage device whereby each chain-link converter is controllable to provide a stepped variable voltage source; and a second voltage source converter having a third terminal connected to a second transmission conduit, a fourth terminal for connection to the return conduit, and at least one converter limb extending between the third and fourth terminals, the or each converter limb including third and fourth limb portions separated by a corresponding second AC terminal connected to a respective phase of a second AC network, the third limb portion including a third chain-link converter extending between the associated second AC terminal and the third terminal, the fourth limb portion including a fourth chain-link converter extending between the associated second AC terminal and the fourth terminal, and each chain-link converter including a plurality of series connected chain-link modules each having a plurality of switching elements connected in parallel with an energy storage device whereby each chain-link converter is controllable to provide a stepped variable voltage source, wherein each of the second and third chain-link converters consists of a first number of series-connected chain-link modules; and each of the first and fourth chain-link converters consists of a second number of series-connected chain-link modules, the second number being greater than the first number.

* * * * *